United States Patent [19]
Kampe

[11] 4,030,289
[45] June 21, 1977

[54] THRUST AUGMENTATION TECHNIQUE AND APPARATUS

[75] Inventor: Robert F. Kampe, West Hartford, Conn.

[73] Assignee: Chandler Evans Inc., West Hartford, Conn.

[22] Filed: Oct. 29, 1973

[21] Appl. No.: 410,606

[52] U.S. Cl. .................................. 60/204; 60/264; 60/269
[51] Int. Cl.² ......................................... F23R 1/00
[58] Field of Search .................. 60/204, 264, 269; 417/151, 179, 180

[56] References Cited
UNITED STATES PATENTS 3,420,060  1/1969  Ostroff et al. ...................... 60/264

Primary Examiner—Samuel Feinberg

[57] ABSTRACT

A thrust augmentation technique wherein a primary gas stream is directionally switched at a high rate to produce flow discontinuities in the interest of increasing efficiency. Apparatus in accordance with the invention includes a fluidic switch, particularly a controlled expansion thrust vector control nozzle, which delivers a pulsating primary gas stream to an eductor or lift surface.

7 Claims, 1 Drawing Figure

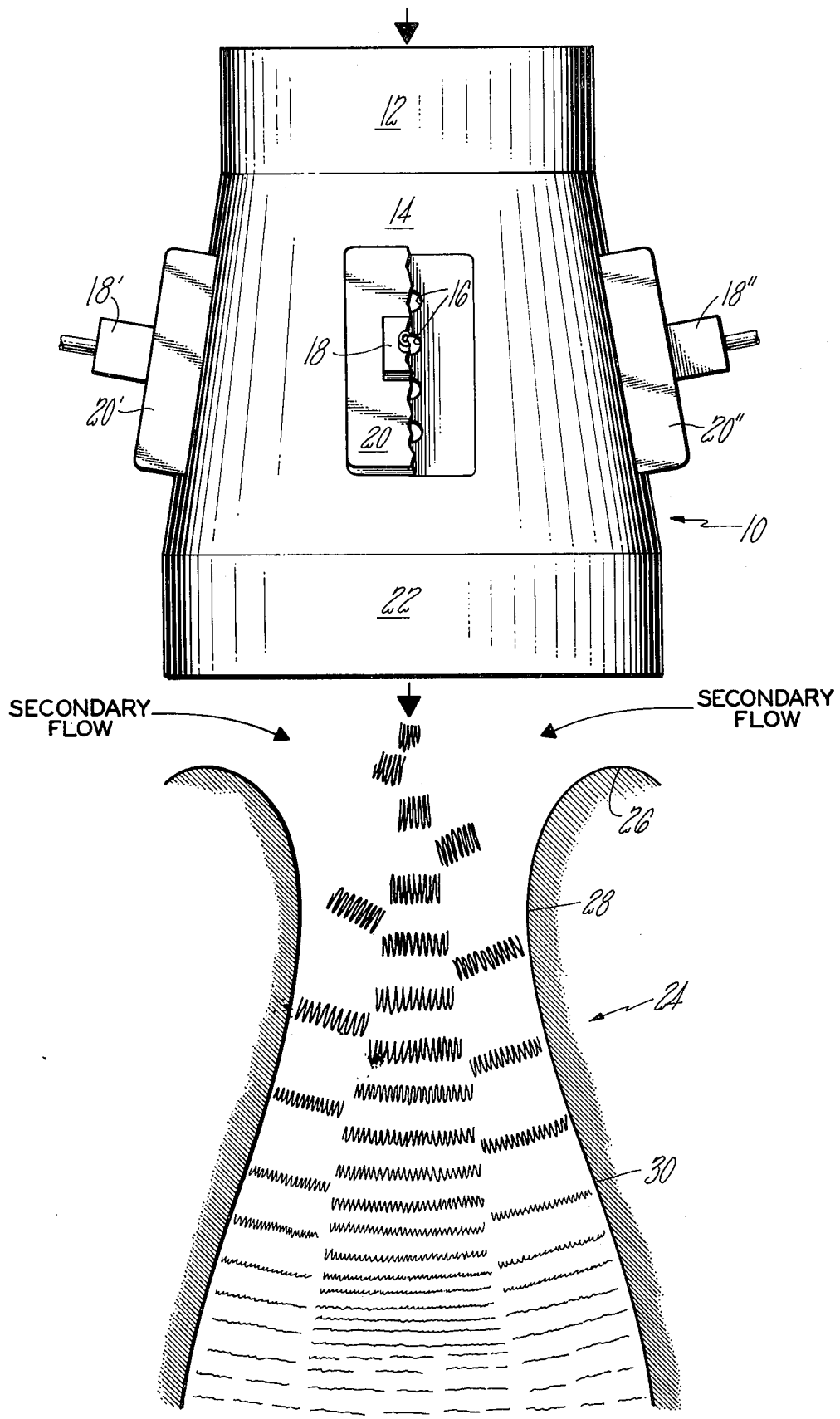

THRUST AUGMENTATION TECHNIQUE AND APPARATUS

BACKGROUND OF THE INVENTION

1. Field of the Invention

The present invention relates to the augmentation of the thrust provided by a gas generator or other source of a pressurized fluid stream. More specifically, this invention is directed to a thrust augmentor characterized by the combination of a controlled expansion thrust vector control nozzle and an eductor or lift surface wherein secondary flow entrainment efficiency is enhanced by switching flow in the nozzle at a high rate. Accordingly, the general objects of the present invention are to provide novel and improved methods and apparatus of such character.

2. Description of the Prior Art

Thrust augmentors are well known in the art. The prior art thrust augmentation devices include those which employ steady-state primary flow out of a nozzle through a large shroud or eductor, or over a Coanda surface, to entrain secondary flow by shearing action. Also known in the prior art are trust augmentors wherein steady-state primary flow out of a series of alternately offset "hypermixing" nozzles is employed to increase entrainment and mixing action; the nozzles discharging into a mixing duct. Further prior art efforts at thrust augmentation include pulse reactors which combine pulse jets with eductors and crypto-steady flow eductors which employ rotating jets discharging into a mixing duct. For a complete description of the crypto-steady flow eductor technology, reference may be had to USAAVLABS Techinical Report 66–18 entitled "Steady-State Thrust Augmentors And Jet Pumps". For a discussion of pulsed reactor type thrust augmentors, reference may be had to Report No. ARD-286 entitled "Interim Summary Report on Investigation Of The Process Of Energy Transform From An Intermittent Jet To Secondary Fluid In An Ejector-Type Thrust Augmentor" submitted to the Office of Naval Research on Mar. 31, 1961 by Hiller Aircraft Corporation. For a discussion of steady-state primary flow eductors and inductors employing "hypermixing" nozzles, reference may be had to an article appearing in J. Aircraft, Volume 9, No. 3, Mar. 1972, at Pages 243–248, by Richard B. Fancher and entitled "Low-Area Ratio, Thrust-Augmenting Ejectors".

Previous thrust augmentors have been characterized by relatively low pumping efficiency and/or complexity and thus lack of reliability. Also, prior art thrust augmentors have usually been of unacceptably large size; it having previously been necessary to employ eductors of large dimension with a long mixing section to approach the desired pumping efficiency. As a consequence of these deficiencies of the prior art, and particularly the low efficiency, prior art thrust augmentation schemes have not been practical for use in the generation of primary lift for VTOL vehicles nor until recently have the previously available devices been sufficiently efficient to enable utilization as VTOL attitude control devices. The inefficiency of prior art thrust augmentors is particularly apparent in off-design operating regimes. It is also noteworthy that prior art thrust augmentation devices and techniques have been further characterized by a lack of flexibility in that usually only a single control variable could be manipulated in an attempt to broaden the operating regime or control pumping efficiency.

SUMMARY OF THE INVENTION

The present invention overcomes the above briefly discussed and other deficiencies and disadvantages of the prior art by providing a novel and improved technique of thrust augmentation and a pulsed vector thrust augmentor for use in the practice of such novel technique. In accordance with the invention a thrust vector control device, in the form of a fluidic switch, is combined with a lift surface or eductor and the control device is switched at relatively high speeds to improve pumping efficiency and subsequent flow mixing. The rapid switching rate converts the constantly flowing jet entering the fluidic switch into closely spaced gas pulses which exit the fluidic switch traveling in different angular directions with respect to a normal flow axis; the pulse-to-pulse flow direction being variable in accordance with a sequence. Secondary air is both forced along in front of each pulse and flows into the rarefaction behind each pulse thereby enhancing the pumping efficiency. In accordance with a preferred embodiment of the invention, the fluidic switch is a controlled expansion thrust vector control nozzle. The combination of such a nozzle with an eductor results in a thrust augmentor wherein switching control may be achieved without moving parts and the pumping efficiency is a function of switching rate, the number and locations of the switched positions of the stream and the source pressure. In the prior art source pressure was typically the only control variable.

BRIEF DESCRIPTION OF THE DRAWING

The present invention may be better understood and its numerous objects and advantages will become apparent to those skilled in the art by reference to the accompanying drawing which is a schematic view of a preferred embodiment of the invention.

DESCRIPTION OF THE PREFERRED EMBODIMENT

With reference to the drawing, a thrust vector control device of fluidic switch is indicated generally at 10. In the interest of facilitating understanding of the invention the switch 10 has been shown greatly exaggerated in size. While not limited to the employment thereof, a fluidic switch of the type disclosed in copending application Ser. No. 263,843 filed June 16, 1972, Pat. No. 3,995,662 granted Dec. 7, 1976 and assigned to the same assignee as the present invention is well suited for use in the present invention. The disclosure of application Ser. No. 263,843 is incorporated herein by reference. The fluidic switch 10 will typically include a convergent or throat section 12 and a divergent section 14 whereby supersonic velocity will be imparted to fluid delivered to the upstream end of the device. A plurality of groups of linearly aligned control ports, the aligned ports being positioned in planes through the axis of switch 10, will be positioned about divergent portion 14 of switch 10. In the disclosed embodiment there will be four ports, such as ports 16, in each group and the groups of control ports will be displaced about the nozzle by 90° from one another. It is to be understood that an operative device can be produced which employs a single control port for each desired direction of stream deflection. Control ports 16 are either closed or open to the ambient atmosphere via solenoid operated control valves 18 mounted on housings or chamber defining members 20; the members 20 permitting simultaneous communication to be established between all of the ports of each group. As an alternative to the use of solenoid operated control valves, the valves 18 may be fluidic switches; i.e., the device 10 may be a two stage device wherein first fluidic switches are employed to control delivery of ambient air to ports 16 of the fluidic switch 10. In the manner described in copending application Ser. No. 263,843, the stream discharged from switch 10 will be axial with all of the control ports open to the ambient atmosphere. When it is desired to deflect; i.e., switch; the stream to one side of the nozzle the control port or ports at that side of the nozzle will be isolated from the ambient atmosphere by means by closing the associated control valve. The closing of the control ports produces the desired switching action due to the fact that the stream existing into the divergent portion 14 of switch 10 through throat 12 will normally pump gas through the open control ports by entrainment. This pumping action will continue after the closing of a selected port or group of control ports and a low pressure pocket or region will thus be formed in the vicinity of the closed ports. As long as this low pressure pocket is maintained the stream will be deflected by the pressure differential thus generated thereacross.

Although not essential for operation of the present invention, the fluidic switch or thrust vector control nozzle 10 may also be provided with a downstream section 22. Nozzle portion 22 may be of either cylindrical shape relative to the nozzle axis or of frustoconical shape with a divergence rate less than that of nozzle portion 14. The transition in nozzle internal wall shape from diverging section 14 to section 22 minimizes the area available for counter-flowing entrainment flow which would tend to pass in the upstream direction and have a deleterious effect on the low pressure pocket created by the closing of a group of control ports. Restated, when present the downstream nozzle portion 22 enhances the stability of the fluidic switch by providing a surface upon which the deflected stream will impinge; the defected stream thus sealing the boundary layer and preventing both axial flow and in-flow. The limitation of the area available for counter-flow also results in the control ports contributing a greater portion of the total entrainment flow and device is thus capable of rapid response to switching commands delivered to the control valve 18.

To summarize, the thrust vector control nozzle or fluidic switch 10 comprises a stable device, preferably utilizing supersonic flow, wherein the jet or stream may be rapidly and accurately switched between a plurality of stable positions with respect to the axis of switch 10. In actual practice, switching rates in excess of 100 cycles per second have been achieved.

The stream from switch 10 discharges into a thrust augmentor indicated generally at 24. In the disclosed embodiment augmentor 24 includes a bell mouth portion 26, a straight or mixing section 28 and a diffuser section 30. The design of augmentor 24 is in accordance with techniques well known in the art. In combining augmentor 24 with switch 10 care must be taken to insure that the deflected primary flow from switch 10 does not impinge directly against the wall of the augmentor.

In operation, as depicted in the drawing, the stream exiting from the switch 10 will be "switched" at a sufficiently fast rate so that discontinuities in flow will occur. These flow discontinuities result in a rarefaction of the air behind each pulse or slug of primary gas and a compression of the ambient air ahead of each gas pulse. The pulses of primary gas effectively push the ambient air; i.e., the pulses induce movement of the ambient air; thus producing a condition where more secondary air can flow into the rarefactions behind each primary gas pulse. The rapid switching of the primary gas stream results in a high pumping efficiency and subsequent flow mixing in augmentor or eductor 24 and this high pumping and mixing efficiency permits the size of the augmentor to be drastically reduced when compared to the prior art.

In the operation of the present invention, a plurality of control variables may be adjusted in the interest of varying pumping efficiency. The first of these variables is the supply pressure of the gas delivered to switch 10. In the prior art supply pressure was generally the only control variable which could be modulated. In accordance with the present invention, in addition to supply pressure, control may be exercized over the primary stream switching frequency and the number and location of the positions to which the primary jet may be switched. Thus, when compared to the prior art, the present invention has greatly increased flexibility and thus enhanced adaptability to the particular operating conditions encountered.

While a preferred embodiment has been shown and described, various modifications and substitutions may be made thereto without departing from the spirit and scope of the invention. Thus, by way of example, while a closed eductor type augmentor has been shown in the drawing, the flow from switch 10 may be directed over a lift surface which is, in effect, and inside-out eductor or Coanda type augmentor. Accordingly, it is to be understood that the present invention has been described by way of illustration and not limitation.

What is claimed is:

1. A method of thrust augmentation comprising the steps of:
   generating a stream of primary gas, said stream having a normal flow axis;
   varying the angular direction flow of the primary gas stream with respect to its normal axis at a sufficiently rapid rate to interrupt the stream to produce gas pulses traveling in different angular directions in a predetermined sequence; and
   directing the gas pulses to an eductor, rarefraction of ambient air behind each pulse and compression of the ambient air past the eductor.

2. The method of claim 1 wherein the step of varying the angular direction of flow comprises the steps of:
   directing the primary gas stream through a fluidic switch having an axis and control ports displaced from one another with respect to the axis; and
   exercising control over the ports to switch the stream between a plurality of stable positions with respect to the fluidic switch axis.

3. The method of claim 2 wherein the step of exercising control over the control ports comprises:
   selectively closing the control ports to the ambient atmosphere.

4. The method of claim 3 further comprising the step of:
   imparting supersonic flow to the primary gas stream.

5. The method of claim 4 wherein the step of directing the angularly displaced gas pulses to an eductor comprises:
   causing the gas pulses to enter an open ended eductor without impinging directly against the walls of the eductor.

6. The method of claim 1 further comprising the step of:
   imparting supersonic flow to the primary gas stream.

7. The method of claim 1 wherein the step of directing the angularly displaced gas pulses to an eductor comprises:
   causing the gas pulses to enter an open ended eductor without impinging directly against the walls of the eductor.

* * * * *